United States Patent
Bump et al.

(10) Patent No.: US 10,671,591 B2
(45) Date of Patent: Jun. 2, 2020

(54) CONFIGURATION-FREE ALERT MONITORING

(71) Applicant: Invensys Systems, Inc., Foxboro, MA (US)

(72) Inventors: Scott S. Bump, Franklin, MA (US); Hugh S. Hanson, Mansfield, MA (US); James G. Luth, Foxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 463 days.

(21) Appl. No.: 14/863,010

(22) Filed: Sep. 23, 2015

(65) Prior Publication Data

US 2017/0083561 A1 Mar. 23, 2017

(51) Int. Cl.
*G06F 16/23* (2019.01)
*G06F 16/22* (2019.01)
*G05B 23/02* (2006.01)
*G06Q 10/00* (2012.01)

(52) U.S. Cl.
CPC ..... *G06F 16/2358* (2019.01); *G05B 23/0272* (2013.01); *G06F 16/22* (2019.01); *G06Q 10/20* (2013.01)

(58) Field of Classification Search
CPC ............................................... G06F 17/30368
See application file for complete search history.

(56) References Cited

U.S. PATENT DOCUMENTS

| | | | | |
|---|---|---|---|---|
| 6,611,867 B1* | 8/2003 | Bowman-Amuah | | H04L 41/046 709/218 |
| 2005/0198373 A1* | 9/2005 | Saunderson | | H04L 12/423 709/238 |
| 2012/0005542 A1* | 1/2012 | Petersen | | G06F 11/0709 714/48 |
| 2012/0158205 A1* | 6/2012 | Hinman | | G05B 23/0216 700/297 |
| 2016/0330082 A1* | 11/2016 | Bliss | | H04L 41/22 |

* cited by examiner

*Primary Examiner* — Mark D Featherstone
*Assistant Examiner* — Tony Wu
(74) *Attorney, Agent, or Firm* — Stinson LLP

(57) ABSTRACT

Systems and methods for generating an event-based data set using a computer implemented asset monitoring system are provided. An asset repository stores data related to one or more commissioned assets of an asset monitoring system. When event data is received from an asset, whether an asset maintenance record corresponding to the asset exists in the asset repository is determined based on comparing the data in the asset repository to the event data. When the asset maintenance record is determined to not exist in the asset repository, an asset identification record corresponding to the asset is rendered. The asset identification record comprises the event data and additional asset-related data collected from the asset. An event-based data set is generated based on the asset identification record.

20 Claims, 8 Drawing Sheets

CONFIGURATION-FREE ALERT MONITORING

BACKGROUND

Maintenance operations related to system assets are assisted through the use of maintenance software applications. The applications typically monitor asset health for a broad range of system assets, such as assets used in process control, assets that implement home or commercial security, assets related to commercial vehicles, or assets that provide access control based on security privileges of various personnel. The applications typically function in coordination with various platforms, such as industrial process control platforms used to implement a control strategy on field devices or other production line components. Maintenance applications of this type typically enable personnel tasked with asset management, such as maintenance supervisors, to view asset-related information and to determine as well as execute a maintenance plan based on the viewed information.

These types of maintenance applications typically require configuring the application by organizing information related to managed assets as structured data, capable of being presented to the application and being displayed to maintenance personnel as a hierarchical tree of system assets. Configuration is typically required in order to properly enable the application to effectively monitor the maintenance status of thousands of assets. Unfortunately, configuration of this type also requires either a strong dependency on a particular system data structure or significant, replicated work.

Many parts of the system being monitored by the application, notably intelligent devices like transmitters and valve positioners in the case of an industrial process control system, are capable of detecting irregular or noteworthy conditions and reporting these conditions to the platform as "events". Unfortunately, current maintenance software applications are not capable of interacting with assets that have not been conventionally configured. Furthermore, current maintenance software applications require conventional configuration in order to interpret "event data" received from assets, such as asset-specific conditions reported to the maintenance software as alarms, or alerts. As a necessary consequence, current maintenance software applications also require configuration in order to provide asset documentation services, such as historical records of conditions or reports detailing current conditions associated with an asset.

SUMMARY

Aspects of the present invention permit a maintenance application to interact with assets without previously configuring an asset, by relying on event data such as asset-specific conditions reported as alarms or alerts by intelligent devices. Moreover, aspects of the invention permit the receiving of event data, and the generation of event-based data sets comprising unique data used by maintenance applications, in order to properly manage the assets that are monitored. By providing a maintenance software application that accesses stored asset-related data based on received event data without requiring an asset to be configured, the present invention provides for a historical record of maintenance-related data to be constructed from a "configuration-free" asset, and for asset documentation services to be provided without reliance upon a particular system data structure and without requiring significant, replicated work for configuration personnel.

In an aspect, a computer implemented asset monitoring system is configured to generate an event-based data set. The system includes an asset repository storing data related to one or more commissioned assets of an asset monitoring system. The system also includes a processor-readable memory storing processor-executable instructions that, when executed, generate an event-based data set. The instructions receive event data from an asset and determine, based upon comparing the asset-related data in the asset repository to the received event data, whether an asset maintenance record corresponding to the asset exists in the asset repository. The instructions further render an asset identification record corresponding to the asset where the asset maintenance record is determined to not exist in the asset repository. The asset identification record comprises the event-based data set and further comprises additional asset-related data collected from the asset. Additionally, the instructions generate the event-based data set based on the asset identification record.

In another aspect, a tangible processor-readable memory storing processor-executable instructions for generating an event-based data set.

In yet another aspect, a computerized method for operating an asset monitoring system to generate an event-based data set is provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
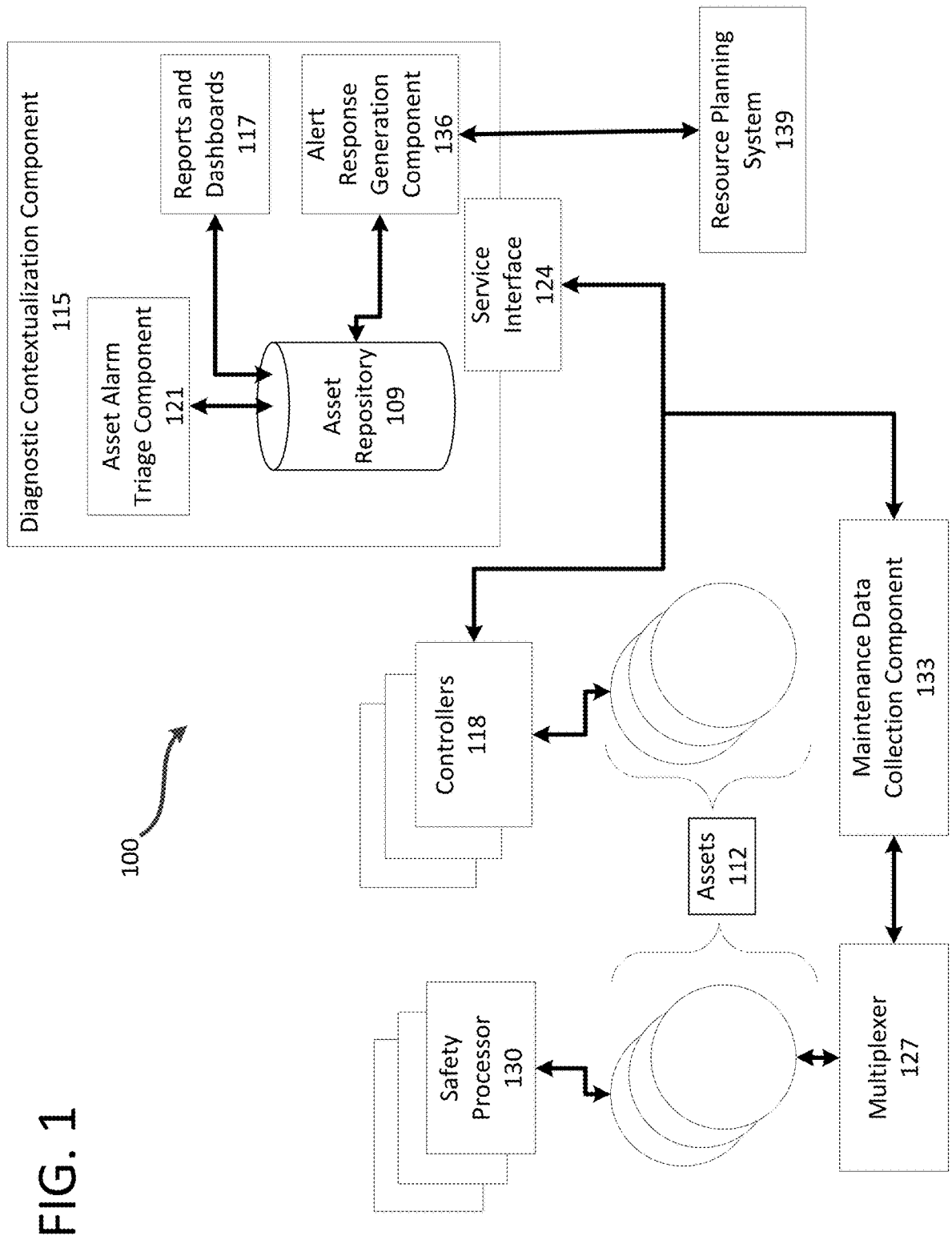
FIG. 1 depicts a system configured to generate an event-based data set in an asset monitoring system according to an embodiment of the present invention.

FIG. 1 depicts one example of an asset maintenance system configured to receive updates related to assets that comprise the system. In an embodiment, the asset maintenance system comprises an industrial process control system 100 configured to provide supervisory level and/or regulatory level control of an industrial process. In the course of executing process control, the system 100 monitors, logs, and displays relevant manufacturing/production events and associated data. In addition, the system 100 is configured to generate an event-based data set according to an embodiment of the present invention. The system 100 comprises an asset repository 109 (e.g., a persistent store, such as a database) storing asset-related data. The asset-related data is accessible by the system 100 based in part upon event data received by components of the system 100 as will be described herein. In an embodiment, the asset-related data comprises asset-specific data that is used by interpreting an asset parameter descriptive of the condition of an asset 112. The asset repository 109 is configured to store asset-related data comprising an event-based data set descriptive of an asset maintenance record. In an embodiment, the asset 112 is a field device, such as a valve positioner or a transmitter, under the control of the process control system 100 and the asset parameter further comprises a diagnostic bit set. Additionally or alternatively, other examples of asset maintenance systems include various process control systems, such as control systems used to automate the power electronics and associated components used in elevator control systems. Additional examples of asset maintenance systems further comprise: assets used in the implementation of security alarm systems, assets used in the monitoring of vehicle fleets such as commercial vehicle fleets, and assets used to restrict and/or monitor access based on personnel category (e.g. employee, visitor, general public, etc.) and/or other factors, through the use of assets such as access badges, identification cards, or the like.

Aspects of this invention relate to a system for generating an event-based data set by accessing asset-related data in the asset repository based upon received event data (e.g., an asset parameter) received from an asset, such as an intelligent field device. In an embodiment, the asset parameter comprises a diagnostic bit set. Additionally or alternatively, the asset parameter comprises a parameter provided by an asset, such as a parameter descriptive of current amplitude applied to a valve positioner, and/or various forms of data provided by assets used in the asset maintenance systems described above. In another embodiment, the asset parameter is collected from the asset by a diagnostic contextualization component 115. In yet another embodiment, the asset parameter is based upon various forms of observational data related to an asset such as video, or based upon data descriptive of the video such as text-based data files.

In an embodiment, diagnostic contextualization component 115 is configured to retrieve sufficient relevant data based on the bit set. The diagnostic contextualization component 115 is configured to receive alerts from controllers 118 and to prioritize data related to alerts using asset alarm triage component 121. A service interface 124 communicates with diagnostic contextualization component 115 to access asset repository 109 based on event data received from assets 112. The service interface 124 is configured to connect to asset condition data such as alerts, as well as to check incoming condition data against asset repository 109 to identify historical information related to the asset, providing asset identification and maintenance without requiring configuration of the asset 112 beforehand. In this manner, the system utilizes service interface 124 to connect to asset condition data and allow any asset or system to deliver conditions, asset metadata, maintenance instructions, updates, and the like to the asset repository 109.

The first steps in the use of a conventional asset management application are typically configuration activities. These activities usually consist of creating templates to define asset types or classes, creating instances of those types of assets, configuring the parameters of the assets and deploying those parameters to the assets in a step called commissioning. Configuration is required to make the assets operate correctly and generally cannot be avoided. Asset management applications that are used in the system post-configuration/commissioning (e.g., maintenance took) typically present a hierarchical (tree) view of the system assets being managed. Assets are located by browsing, or searching the asset hierarchy. Usually, these downstream tools consume the data from the configuration tool's database or require their own manual configuration. This either establishes a strong dependency on a particular system data structure or means significant, replicated work for configuration. Aspects of the presenting invention advantageously interact with assets 112 having no previous asset configuration. By providing configuration-free asset maintenance as described herein, significant improvements to asset maintenance efficiency are possible: asset condition history is more easily documented, major events (such as asset hardware replacement) are automatically captured without requiring manual reconfiguration, and intermediaries (e.g., system platform software, stand-alone condition monitoring applications, etc.) can be used to transform protocol-specific conditions into a usable format.

In an embodiment, diagnostic contextualization component 115 is further configured to generate a contextualized alert based on the retrieved data after retrieving the relevant data. The contextualized alert includes asset-related data such as alert (i.e., "condition") details, system context, asset-specific documentation data, and historical information about previous maintenance. The diagnostic contextualization component 115 also generates an alert resolution status in part based on, for example, determining whether data related to an actionable output (i.e., planned asset maintenance) exists for the asset 112. The alert resolution status comprises data that allows for the contextualized alert to be presented as a prioritized list, such as a list displayed to a maintenance supervisor as part of a dashboard, for example.

In an embodiment, the asset 112 comprises an intelligent field device capable of detecting irregular or noteworthy asset-related details that are of particular interest to maintenance personnel tasked with using maintenance tools to maintain aspects of control system 100. In another embodiment, the noteworthy asset-related details are of interest to maintenance personnel, in contrast to plant operation personnel who are tasked with operating the control system 100. In an embodiment, the component 115 is implemented in combination with process control system 100 used on a production line.

Still referring to FIG. 1, the asset-specific data stored in the asset repository 109 further comprises asset identification data and alert prioritization data. In an embodiment, the asset repository 109 comprises an asset information directory, an alert historian, and an alert profile historian. The diagnostic contextualization component 115 is coupled to the asset repository 109 and is configured for generating an event-based data set. According to aspects of the invention, the system of FIG. 1 interacts with events as conditions are presented rather than a system tree. Each asset 112 is able to deliver conditions to the system even when the system has never been configured to know about the particular asset 112. This makes the system essentially configuration-free. It can be installed where assets 112 deliver conditions using the interface services and is capable of immediately gathering conditions and information gathering information about the assets 112 that create them. A historical record of all conditions is maintained along with the history of work orders executed against them. Reports that detail all current conditions associated with the asset 112 and all of its condition and maintenance history are made available. In an embodiment, the diagnostic contextualization component 115 is configured to detect asset-related details related to maintaining the asset in an optimal state of performance, and is configured for distributing asset-related details to the appropriate maintenance staff and providing various data including asset-related details, system context, and historical information about previous maintenance.

The diagnostic contextualization component 115 is configured for generating event-based data by accessing asset-related data in the asset repository 109 via service interface 124, which is configured to evaluate the asset-related data based on the received event data. The diagnostic contextualization component 115 is further configured for generating an event-based data set based on the accessed asset-related data. In an embodiment, the diagnostic contextualization component 115 is further configured to generate a contextualized alert based on retrieved asset identification data and retrieved alert prioritization data. In this manner, diagnostic contextualization component 115 determines whether actionable output related to the contextualized alert has been received, which permits generating an alert resolution status based on the determination. The diagnostic contextualization component 115 is configured to perform functions based at least in part upon the generated event-based data set.

In an embodiment, the service interface 124 comprises one or more industry standard service interfaces, such as Windows Communication Foundation (WCF) services interfaces or web services interface or the like. In another embodiment, the service interface 124 comprises at least one interface standard used to enable inter-process and/or inter-system communication, such as the component object model (COM), the Common Object Request Broker Architecture (CORBA), Java Messaging Service (JMS), and the like. In yet another embodiment, the service interface 124 is configured to allow any asset or system to deliver asset-related data to the asset repository, such as conditions, asset metadata, and instructions related to updating alert profile data, as will be described herein.

The event-based data set is configured for providing data that allows for the display of information related to an alert, such as data comprising a contextualized alert status that provides for the display of alerts in the form of a prioritized list of asset-related details ordered by severity. In an embodiment, the prioritized list of asset-related details comprises contextualized alerts generated from information accessed in the asset repository 109 by the diagnostic contextualization component 115. An asset alarm triage component 121 functions as part of the diagnostic contextualization component 115 to determine and generate data related to an alert resolution status. In turn, diagnostic contextualization component 115 accesses the alert resolution status to present the contextualized alerts as a consolidated, prioritized list, generating asset-related data that allows for detected conditions to be presented in a manner that improves how actionable descriptions are organized and communicated. Data comprising the prioritized list is configured for display as asset-related details ordered by severity for use with reports and dashboards 117. In an embodiment, the reports and dashboards 117 are presented on a user interface. Additionally or alternatively, the reports and dashboards 117 are presented as part of a web application.

Still referring to FIG. 1, service interface 124 is configured to receive event-based data (e.g., an "alert," an "asset parameter," or a "diagnostic bit set") from an asset 112 and to complete tasks related to building an event-based data set related to the asset 112 without requiring the asset 112 to have been previously configured. Configuration of the asset 112 comprises tasks such as creating templates defining an asset type or asset class, or creating instances of the type of asset 112, and typically requires dependence upon a particular data structure or significant manual work. In an embodiment, the service interface 124 communicating with the diagnostic contextualization component 115 receives the alert from the asset 112 by communicating with a controller 118 to pass the asset parameter to the diagnostic contextualization component 115 via the service interface 124 associated with diagnostic contextualization component 115. The service interface 124 is programmed to provide, for example, configuration-free alert monitoring by providing received alerts as event-based data to the diagnostic contextualization component 115.

With further reference to FIG. 1, in the illustrated embodiment, the service interface 124 in communication with the diagnostic contextualization component 115 is configured to receive an asset parameter passed via a multiplexer 127. The asset 112 as shown in FIG. 1 also communicates with a safety processor 130. In an embodiment, the safety processor 130 comprises processors configured to independently process inputs from one or more assets 112 and the processors "vote" on the data in part to provide a safety barrier between the data provided by the assets 112 and an application configured to monitor the assets 112. The multiplexer 127 communicates with a maintenance data collection component 133 in the illustrated embodiment to pass the asset parameter from the communicating asset 112 to the diagnostic contextualization component 115. The service interface 124 associated with the diagnostic contextualization component 115 receives asset parameters from the multiplexer 127. In yet another embodiment, maintenance data collection component 133 communicates with the multiplexer 127 and the service interface 124 of the diagnostic contextualization component 115 to facilitate the transmission of asset parameters from assets 112 to the diagnostic contextualization component 115.

Still referring to FIG. 1, in an embodiment, asset-specific data provided by the asset repository 109 further comprises alert response data. And alert response data further comprises descriptive data that provides context related to the state of the asset parameter, as will be further described herein. In another embodiment, the alert response data further comprises: other alerts reported by the particular asset 112; installation history for asset 112; location details related to asset 112; and maintenance work planned for asset 112. The diagnostic contextualization component 115 is preferably configured to generate an alert resolution status based upon comparing the alert response data to the alert resolution status to render actionable output, as will be further described herein. This actionable output comprises, for example, data describing work planned for asset 112.

The diagnostic contextualization component 115 of FIG. 1 provides updated data in the form of an alert resolution profile to a resource planning system 139. The resource planning system 139 is configured to interpret and integrate real time data for use with process execution application tools. In an embodiment, the diagnostic contextualization component 115 is further programmed to determine, based upon comparing the accessed asset-related data to the received event data, whether an asset maintenance record exists in the asset repository 109 and rendering an asset maintenance record where an asset maintenance record is determined not to exist in the asset repository. In this regard, the asset maintenance record includes an event-based data set as well as additional asset-related data. The diagnostic contextualization component 115 is further programmed to combine the accessed asset-related data with the received event data to update the asset maintenance record where an asset maintenance record is determined to exist in the asset repository. In an embodiment, the diagnostic contextualization component 115 generates an event-based data set comprised of data accessed to generate a result related to the actionable output, the alert resolution profile, and the alert resolution status.

In an embodiment, the asset-related data comprises data descriptive of the asset 112. The data descriptive of the asset comprises an alert record including a historical record of all alerts, and an alert resolution profile record comprising a history of tasks executed in response to the alert, that are executed in order to resolve the alert. In another embodiment, the alert resolution profile record is based on data used to generate an alert resolution profile. In yet another embodiment, data used to generate the asset maintenance record comprises asset identification data, alert prioritization data, and alert response data, as will be further described herein.

Figure 2:
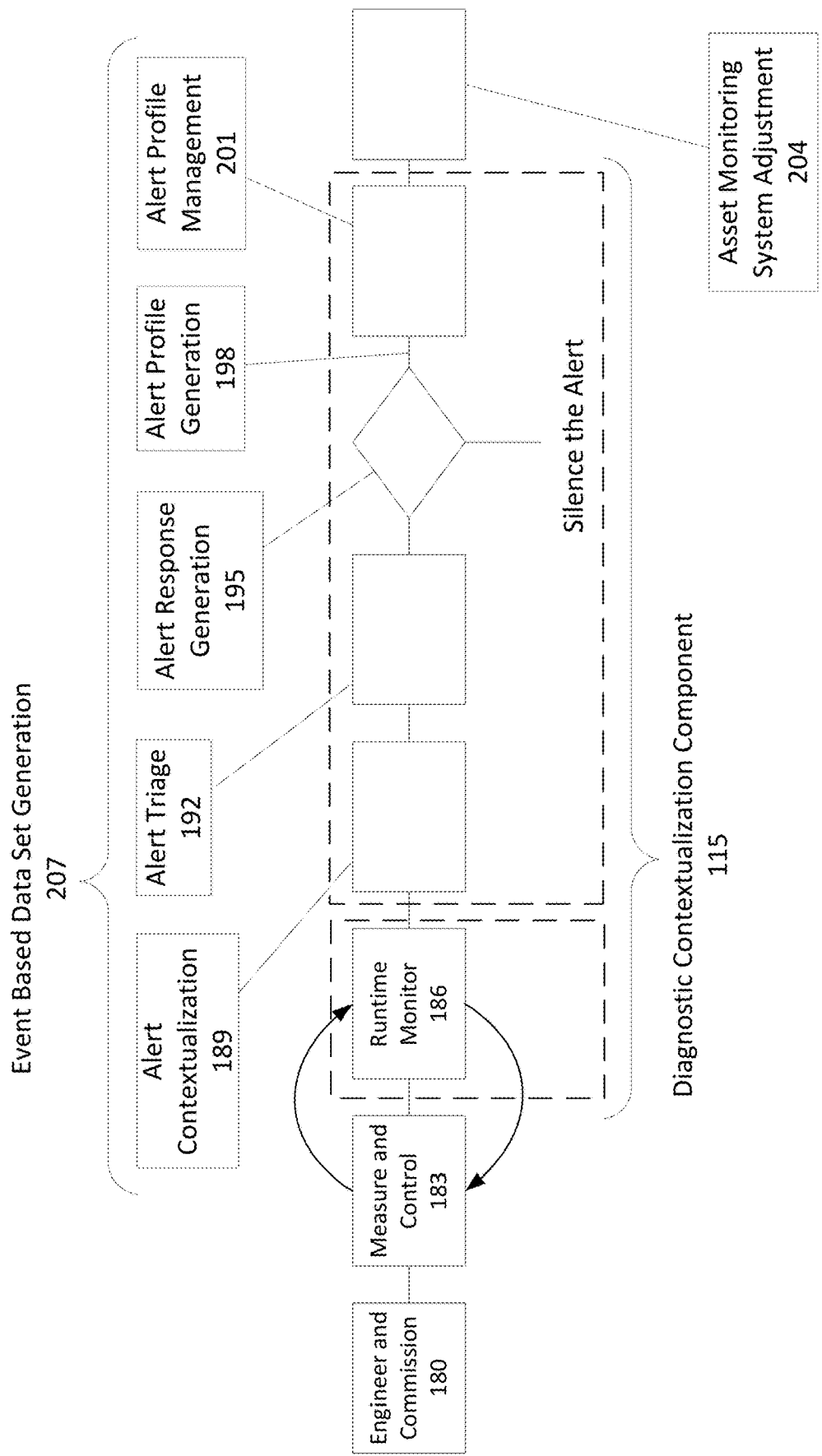
FIG. 2 depicts functional relations among and tasks completed by various software components that interact to provide the event-based data set generation system depicted in FIG. 1 according to an embodiment of the present invention.

FIG. 2 depicts functional relations among various software components that interact to provide the event-based data set generation system depicted in FIG. 1 according to an embodiment of the present invention. Moreover, FIG. 2 illustrates tasks completed by the components. In an embodiment, the functional relations depicted in FIG. 2 allow for various components to complete tasks that result in the installation, control, and monitoring of assets in a manner that increases the effectiveness of the asset monitoring system, resulting in improved results such as increased process control system efficiency. Monitoring the maintenance status of assets includes, for example, generating data (i.e., the event-based data set) to allow for asset maintenance tasks to be executed without requiring the establishment of a strong dependency upon a particular system data structure. In an embodiment, contextualized alerts are generated by accessing data used by the diagnostic contextualization component 115 to generate the event-based data set.

Tasks related to engineering and commissioning an asset maintenance system configured to monitor an asset, such engineering and commissioning component 180 configured to monitor and controls asset 112 as part of an asset monitoring system strategy are conventionally completed using an asset manager such as field device manager software or the like. In an embodiment, tasks related to an asset monitoring system adjustment component 204, in part based on results generated based on an alert profile management component 201, are also typically completed using field device manager software. According to aspects of the invention, installation of an asset, such as asset 112, requires action by the engineering and commissioning component 180. A measure and control component 183 is configured to complete tasks that result in implementation of a control system strategy, as well as to adjust the control system in part based on asset parameters that are measured by the control system during implementation of the control system strategy. Tasks related to the measurement and control of an asset, such as asset 112, are completed using distributed control system and safety software, in one embodiment.

Figure 5:
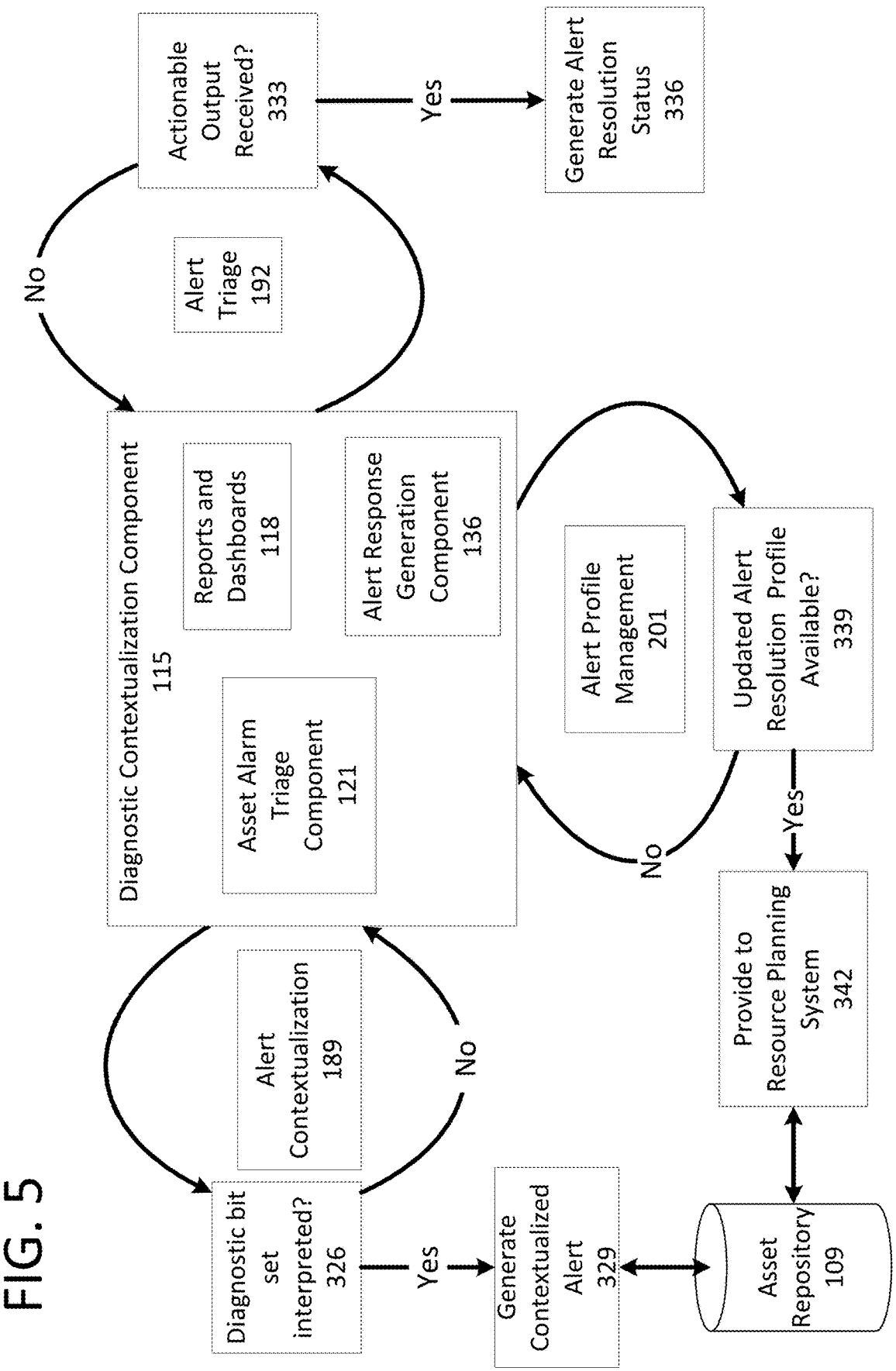
FIG. 5 depicts generating updated determinations related to event-based data set generation according to an embodiment of the present invention.

As previously described in connection with FIG. 1, the diagnostic contextualization component 115 is configured for generating an event-based data set by accessing asset-related data from the asset repository 109. In an embodiment, the diagnostic contextualization component 115 is configured to execute various tasks to generate an event-based data set. In another embodiment, the various tasks are further accomplished by components within the diagnostic contextualization component 115. Runtime monitor 186 component executes tasks that allow for an asset parameter transmitted from the asset 112 to be monitored in real time. In an embodiment, runtime monitor 186 interacts with a measure and control component 183 to execute tasks allowing for data related to measure and control applications as well as runtime monitoring applications to be updated in real time and made available to the diagnostic contextualization component 115 during event-based data set generation 207 as shown in FIG. 5. The diagnostic contextualization component 115 is further configured in an embodiment to provide functionality of a runtime monitor 186.

Diagnostic contextualization component 115 is also configured to complete additional tasks and to operate various components that provide data related to event-based data set generation 207. In an embodiment, the diagnostic contextualization component 115 includes an alert contextualization component 189 that performs contextualization tasks that provide context to asset parameters. The alert contextualization component 189 provides, for example, descriptive data related to asset parameters. In operation, tasks executed by the alert contextualization 189 component generate data used to uniquely present the full context needed to generate an action related to a contextualized alert, and the data is made available to the diagnostic contextualization component 115 during event-based data set generation 207. The service interface 124 in the illustrated embodiment connected to the diagnostic contextualization component 115 performs the alert contextualization component 189 tasks and the runtime monitor 186 tasks previously described.

Referring further to FIG. 2, an alert triage component 192 of diagnostic contextualization component 115 completes alert triage 192 tasks, and uses data generated from alert triage 192 tasks during event-based data set generation 207. Alert triage component 192 provides contextualized alerts as a prioritized list, resulting in the generation of a list of asset-related details ordered by severity. In an embodiment, alert triage component 192 completes asset alarm triage component 121 tasks, such as determining the alert resolution status as described above. The diagnostic contextualization component 115 accomplishes alert response generation tasks as indicated at reference character 195 based on tasks performed by the alert triage 192 and uses data generated from alert response generation 195 tasks during event-based data set generation 207 to generate an event-based data set 230 (see FIG. 3).

An alert profile generation component 198 generates data related to an alert profile for determining whether an actionable output related to the contextualized alert has been received. Determining whether the actionable output related to the contextualized alert has been received includes rendering data descriptive of the asset parameter that is specific to the alert resolution profile, such as data used to generate an active alert resolution profile, as will be further described herein. In an embodiment, the alert response generation tasks comprise silencing the alert as well as alert profile generation 198.

The alert profile management component 201 of the diagnostic contextualization component 115 is additionally configured to complete tasks related to the generated alert profile 198 provided based on the generated alert response 195. The diagnostic contextualization component 115 is configured to use the data generated from alert response generation 195 tasks, alert profile generation 198 tasks, and alert profile management 201 during event-based data set generation 207.

In an embodiment, the asset monitoring system adjustment component 204 is configured for adding to the knowledge base related to the asset 112, adjusting asset parameters that determine an operating state of the asset 112, implementing repair functions pertaining to the asset 112, and implementing replacement functions related to the asset 112. The diagnostic contextualization component 115 is also configurable to utilize the data generated from asset monitoring system adjustment 204 during event-based data set generation 207 to generate an event-based data set.

Figure 3:
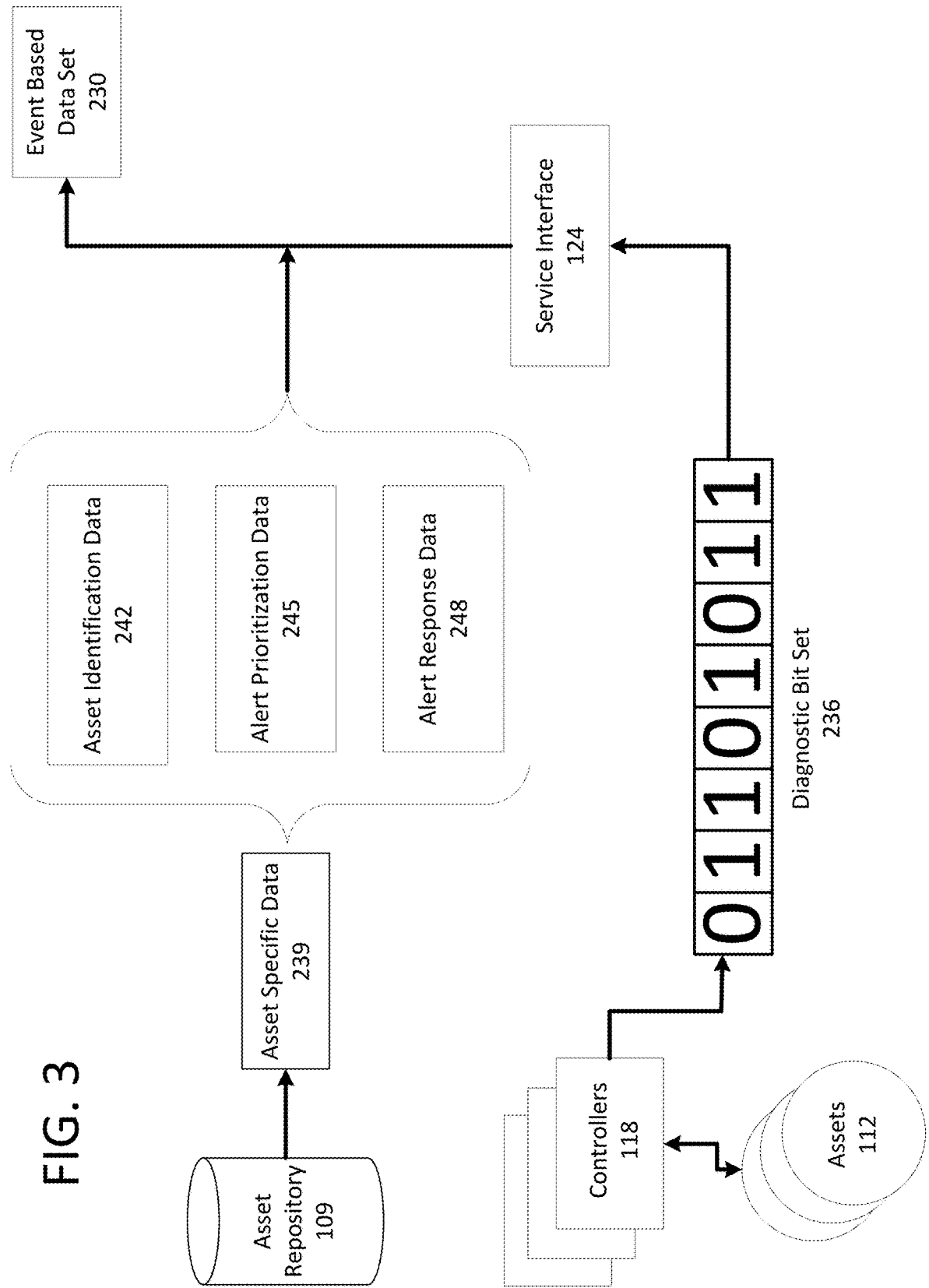
FIG. 3 depicts the generation of an event-based data set according to an embodiment of the present invention.

FIG. 3 depicts the generation of an event-based data set, according to an embodiment of the present invention. The generation of an event-based data set 230 by the diagnostic contextualization component 115 is accomplished during event-based data set generation 207 (see FIG. 2). In an embodiment, data related to the generation of an event-based data set 230 is used by the diagnostic contextualization component 115 to generate a contextualized alert. An event-based data set 230 is generated based in part upon an asset parameter provided from asset 112 as previously described. The controller 118 provides the asset parameter, which comprises a diagnostic bit set 236. The asset-related data of event-based data set 230 includes asset-specific data 239 obtained from the asset repository 109. In an embodiment, the asset-specific data 239 further comprises asset identification data 242 when the particular asset 112 has been configured, alert prioritization data 245, and alert response data 248.

In an embodiment, the asset identification data 242 provides for the meaning of a diagnostic bit set 236 to be interpreted, for example where two identical diagnostic bit sets 236 received by the diagnostic contextualization component 115 via two different assets 112 have different meanings based upon the particular asset 112 sending the diagnostic bit set 236. The diagnostic contextualization component 115 is configured to interpret the diagnostic bit set 236 based in part upon the asset 112 transmitting the diagnostic bit set 236 using asset identification data 242 retrieved from the asset repository 109. The service interface 124 connected to the diagnostic contextualization component 115 interprets the diagnostic bit set 236 to provide access to asset-related data located in the asset repository 109 to generate event-based data set 230. In an embodiment, event-based data set 230 is generated in part based upon the asset identification data 242. In another embodiment, asset identification data 242 comprises asset-specific documentation data useful in interpreting the diagnostic bit set 236.

Additionally or alternatively, event-based data set 230 is generated by diagnostic contextualization component 115 after diagnostic contextualization component 115 accesses alert prioritization data 245 via service interface 124. In an embodiment, the service interface 124 connected to diagnostic contextualization component 115 accesses asset repository 109 based on asset-specific data 239 comprising alert prioritization data 245. Alert prioritization data 245 provides data related to the maintenance history of asset 112 as well as data related to the installation history of asset 112. The event-based data set 230 is generated by diagnostic contextualization component 115 using the alert prioritization data 245 accessed based on the diagnostic bit set 236 provided to the service interface 124. In an embodiment, service interface 124 comprises a WCF service interface, and the WCF service interface further comprises a set of service interfaces configured to parse at least one of the following from the asset-related data: implementation data related to implementing one or more asset maintenance services natively on an asset 112 such as a field device, wherein the implementation data is independent from application support data relating to application services that are external to the field device; and data related to transforming the alert into a protocol-specific format.

The diagnostic contextualization component 115 is further configurable to accomplish the tasks of alert contextualization component 189 and alert triage component 192 based on the retrieved alert prioritization data 245 and the retrieved asset identification data 242 and to use data related to accomplishing the tasks to generate event-based data set 230. In another embodiment, diagnostic contextualization component 115 retrieves alert prioritization data 245 from the asset repository 109 based on the asset identification data 242, and uses data related to retrieving the alert prioritization data 245 in combination with the tasks as described above to generate event-based data set 230.

In an embodiment, diagnostic contextualization component 115 is further configured to determine whether actionable output related to a contextualized alert has been received. The diagnostic contextualization component 115 is additionally configured to generate an alert resolution status based on the determination. In an embodiment, actionable output comprises data related to whether maintenance work has been planned for an asset. In another embodiment, the alert resolution status comprises data that allows for the manipulation of information related to the contextualized alert by the diagnostic contextualization component 115. The alert resolution status comprises data that allows for alert response generation tasks 195 to be accomplished. In an embodiment, the alert resolution status comprises data that allows for contextualized alerts to be displayed as a prioritized list of asset-related details ordered by severity. In another embodiment, data related to determining whether actionable output related to a contextualized alert has been received is used by the diagnostic contextualization component 115 to generate event-based data set 230.

Figure 4:
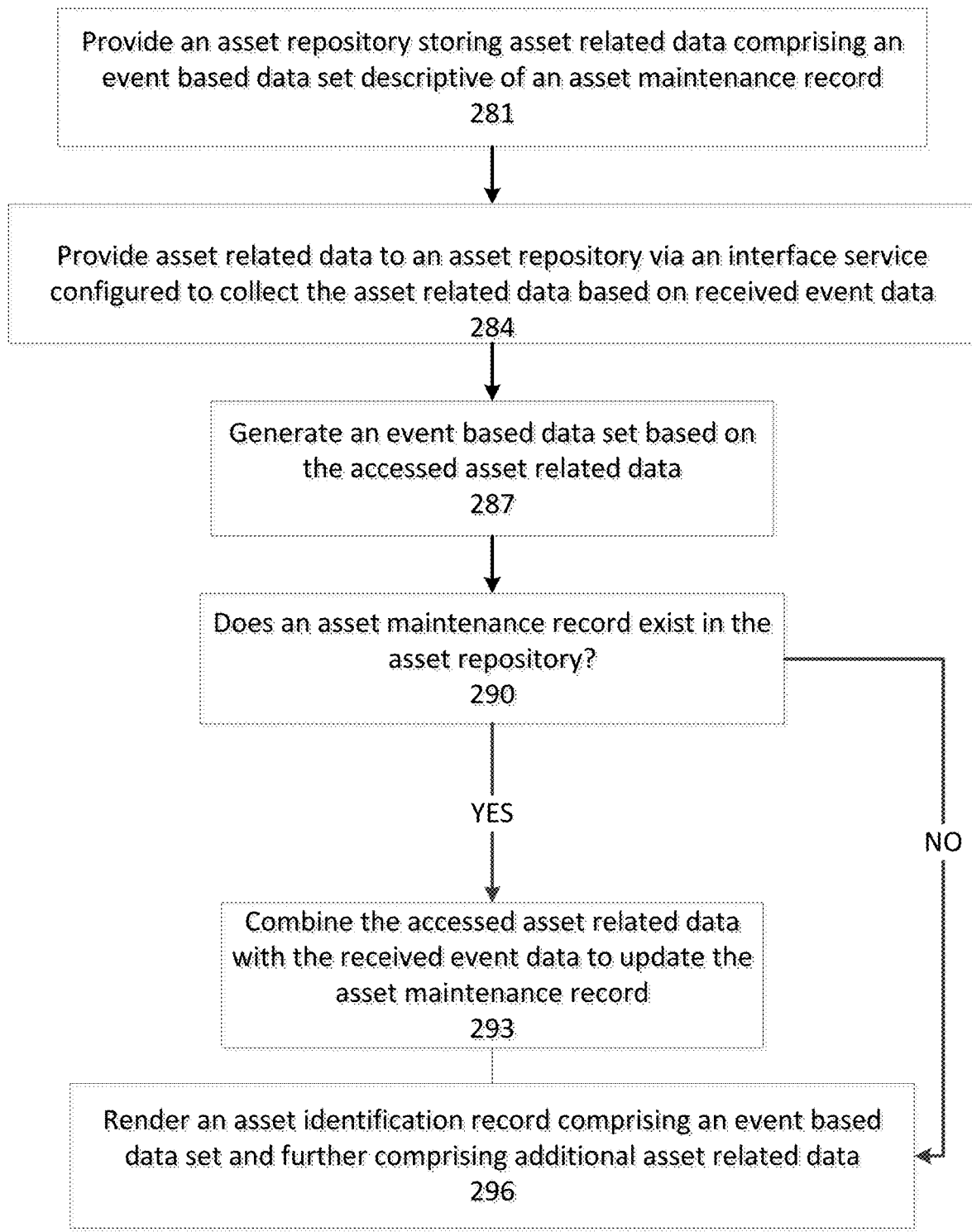
FIG. 4 depicts a computerized method for generating an event-based data set according to an embodiment of the present invention.

FIG. 4 depicts a computerized method for generating an event-based data set, according to an embodiment of the present invention. The process depicted by FIG. 4 begins at 281, where an asset repository 109 is provided. The asset repository 109 is configured for storing asset-related data comprising an event-based data set 230 descriptive of an asset maintenance record. At 284, asset-related data is provided to the asset repository 109 via a service interface 124 configured to collect the asset-related data based on received event data. At 287, an event-based data set 230 is generated based on the accessed asset-related data. In an embodiment, the process continues at 290, where it is determined whether an asset maintenance record exists in the asset repository 109. If it is determined that an asset maintenance record exists in the asset repository 109, the process concludes at 293 where the accessed asset-related data is combined with the received event data to update the asset maintenance record. If it is determined that an asset maintenance record does not exist in the asset repository 109, an asset identification record is rendered comprising an event-based data set 230 and further comprising additional asset-related data.

FIG. 5 depicts generating updated determinations related to event-based data set generation, according to an embodiment of the present invention. In an embodiment, the diagnostic contextualization component 115 is configured to interact with various software components during event-based data set generation 207, such as the various components described above with reference to FIG. 2. The diagnostic contextualization component 115 is configured to determine at 339 whether an asset maintenance record exists in the asset repository, as described above with reference to FIG. 4. In the event an asset maintenance record exists in the asset repository 109, the asset maintenance record is updated. However, if it is determined at 339 that an asset maintenance record does not exist in the asset repository 109, event-based data set generation 207 continues, and an asset identification record is rendered comprising an event-based data set 230 and further comprising additional asset-related data.

In yet another embodiment, generating an event-based data set 230 during event-based data set generation 207 comprises collecting additional asset-related data from the service interface. Such asset-related data is the type of information usually collected during the commissioning process and relates to at least one of: asset vendor data, model data, serial number data, location data, and version data. In other words, the system, via service interface 124, checks incoming conditions against the repository 109 to determine if a condition has ever been received from the source asset 112. If no conditions have been received previously, the service interface 124 collects additional metadata about the reporting asset 112. This metadata includes items like the asset vendor, model, serial number, location, version, etc. In addition, service interface 124 allows major events (e.g., asset hardware replacement) to be captured automatically without the need to manually re-configure the instance for the changes. Any asset 112 connected to the system Ethernet network, for example, could be programmed to implement one or more of the services natively. Alternatively, an intermediary such as Wonderware System Platform available from Schneider Electric or a stand-alone condition monitor application can be used to transform conditions in a protocol-specific format into the service interface 124.

Referring further to FIG. 5, event data used to generate event-based data set 230 comprises an alert descriptive of an asset, such as, for example, at least one of a transmitter and a valve positioner. Generating the event-based data set 230 further comprises combining the provided asset-related data with the stored event-based data set to generate an alert log entry in the asset maintenance record. In another embodiment, the alert log entry comprises data describing an updated state of the alert when the combined reporting asset input comprises data related to a mitigated state of the alert and data associating each asset with at least one of an active alert related to the asset and an alert resolution profile related to the asset.

Figure 6:
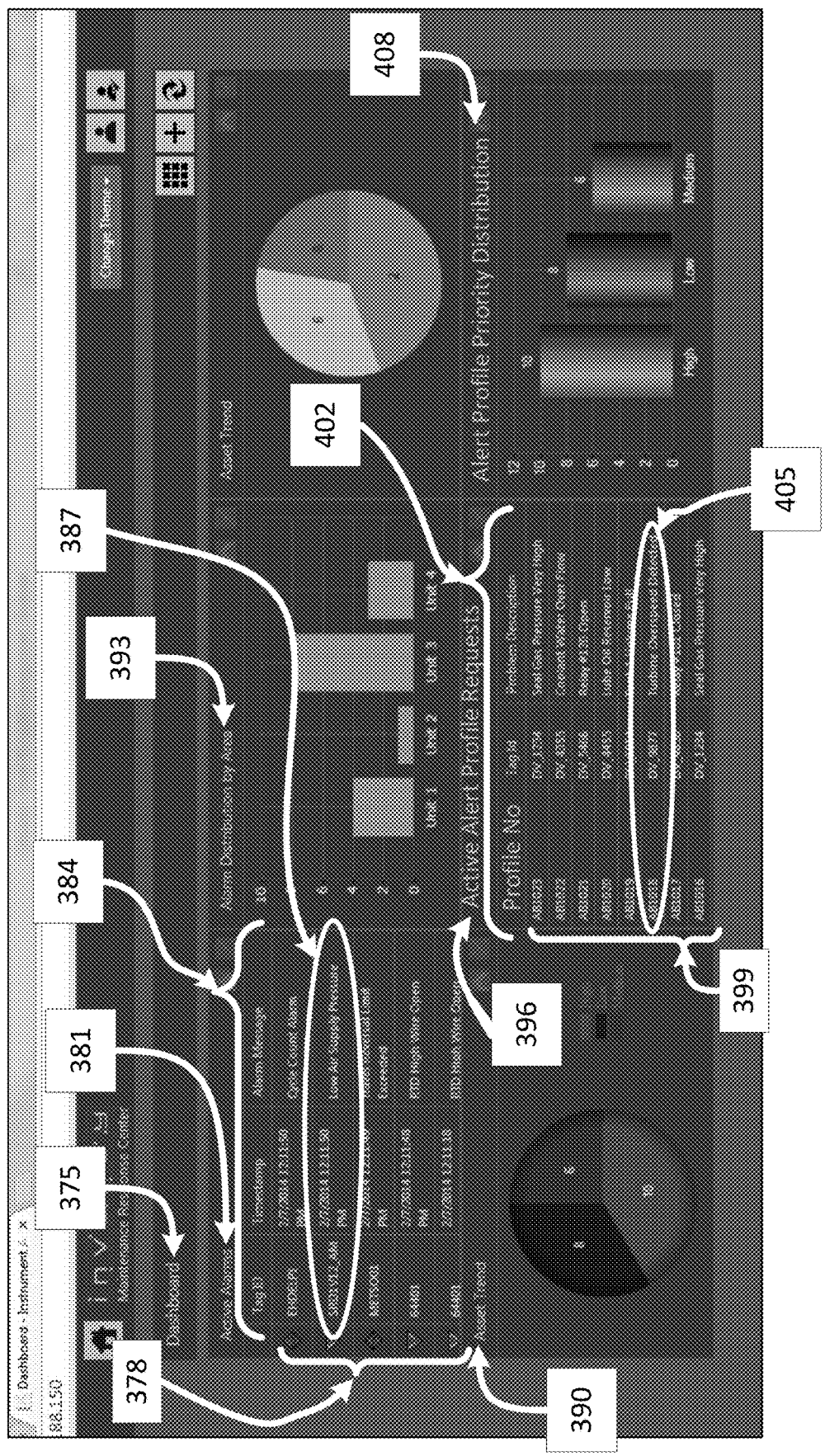
FIG. 6 is an exemplary screen shot depicting a user interface for displaying various details based on data capable of being derived from received event data according to an embodiment of the present invention.

FIG. 6 is an exemplary screen shot depicting a user interface for displaying various details based on data capable of being derived from received event data according to an embodiment of the present invention. In the illustrated embodiment, a dashboard 375 is rendered based on data generated by the diagnostic contextualization component 115 as well as data related to the diagnostic bit set 236 and received by the diagnostic contextualization component 115 via the service interface 124. The diagnostic contextualization component 115 is configured to generate an event-based data set 230 based on asset-related data accessed in the asset repository 109 by the service interface 124. In an embodiment, a portion of the data accessed to render the various displays comprising the dashboard 375 is related to the data the service interface 124 accesses in the asset repository 109 when generating the event-based data set 230 based upon received event data.

In an embodiment, contextualized alerts generated based upon diagnostic bit sets 236 are displayed as a prioritized list of asset-related details ordered by severity. In an embodiment, the prioritized list is presented as an active alert display 381 comprising a summarized severity ordered contextualized alert list 378 on the dashboard 375. The data used to generate the summarized alert list 378 is comprised of summarized contextualized categories 384 derived from data related to the contextualized alert and organized as the summarized alert list 378 based upon the alert resolution status generated by the diagnostic contextualization component 115. The summarized contextualized categories 384 are comprised of, for example, NAMUR category data, alert tag ID data, alert timestamp data, alert message data, and the like. In an embodiment, a summarized alert 387 comprises a contextualized alert capable of being ordered by severity, and is further comprised of summarized contextualized categories 384.

Additionally or alternatively, data generated by the diagnostic contextualization component 115 as well as data related to the diagnostic bit set 236 and received by the diagnostic contextualization component 115 is used to generate additional displays on the dashboard 375 based upon data related to the contextualized alert and prioritized according to the generated alert resolution status. In an embodiment, an additional display comprises an asset trend priority display 390 generated to provide an alternative representation of asset-related data prioritized according to the generated alert resolution status. An additional display comprises an alert area distribution display 393 rendered based on data generated by diagnostic contextualization component 115 including location details related to the asset 112.

Still referring to FIG. 6, in an embodiment, data generated by the diagnostic contextualization component 115 as well as data related to the diagnostic bit set 236 and received by the diagnostic contextualization component 115 is used to generate an active alert profile display 396. The active alert profile display 396 comprises a summarized alert resolution profile list 399. The data used to generate the summarized profile list 399 is capable of being organized as profile categories 402 and further comprise, for example, work order number data, tag id data, problem description data, and the like. In an embodiment, an active alert resolution profile 405 is comprised of profile categories 402. And in an embodiment, the data used to render the profile categories 402 is generated by the diagnostic contextualization component 115 during alert response generation 136 to provide a result related to actionable output to update the alert resolution profile.

The diagnostic contextualization component 115 is further configured to render data descriptive of the asset parameter that is specific to the alert resolution profile, in order to generate data used for the active alert profile display 396. The diagnostic contextualization component 115 is also configured to complete tasks in accordance with alert profile generation component 198 and alert profile management component 201 to provide an alert resolution profile and to update the alert resolution profile. Additionally or alternatively, data generated by the diagnostic contextualization component 115 as well as data related to the diagnostic bit set 236 and received by the diagnostic contextualization component 115 is used to generate additional displays on the dashboard 375 based upon data related to the diagnostic bit set 236, data related to the contextualized alert, data related to the generated alert resolution status, and data related to the alert resolution profile. In an embodiment, priority distribution display 408 provides an alternative representation of data related to the alert resolution profile.

Figure 7:
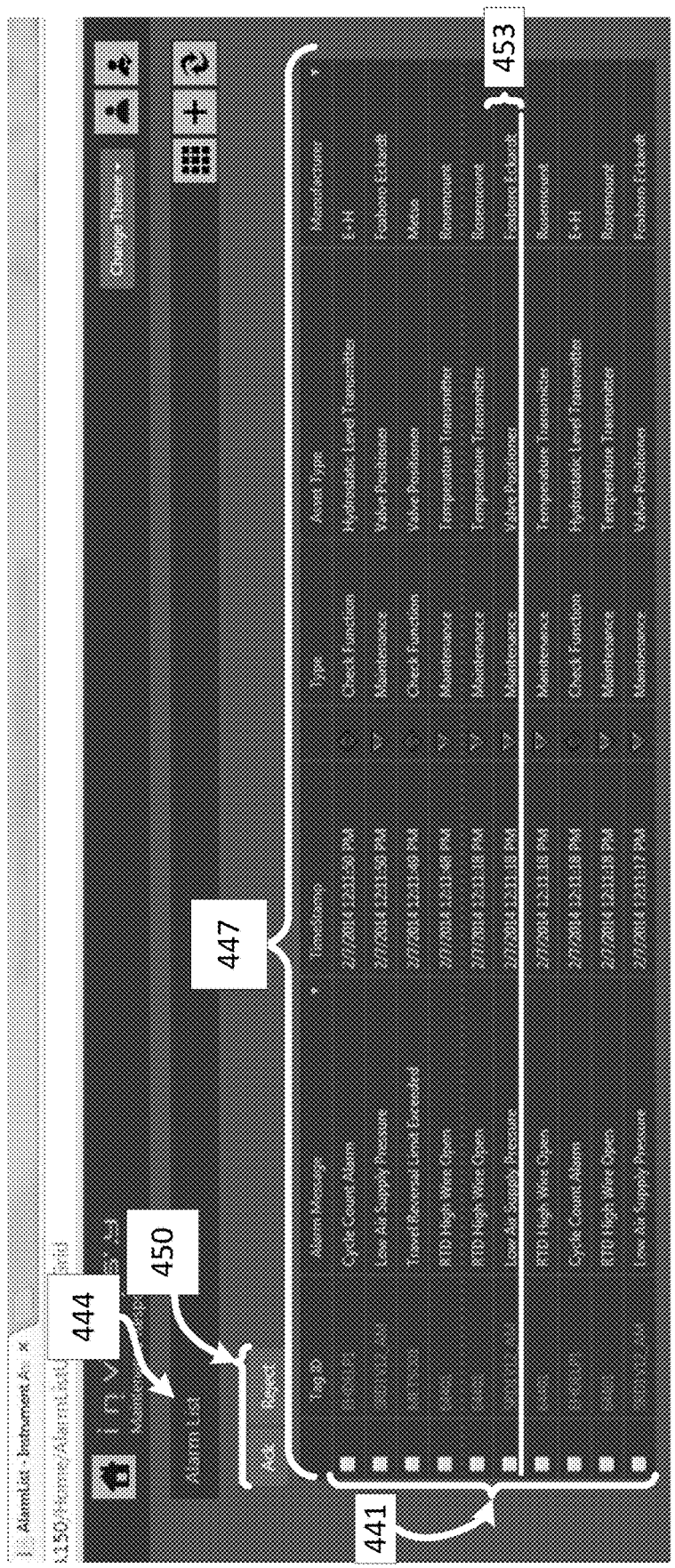
FIG. 7 is an exemplary screen shot of contextualized alerts derived from an event-based data set according to an embodiment of the present invention.

FIG. 7 is an exemplary screen shot depicting a user interface for displaying a list of contextualized alerts according to an embodiment of the present invention. The contextualized alerts are organized as a prioritized alert list 441 of asset-related details ordered by severity. In an embodiment, an alert display 444 is comprised of the alert list 441, and the alert list 441 is comprised of contextualized alerts such as contextualized severity ordered alert 453. Data accessed to render the prioritized alert list 441 and data accessed to render the functionalities provided by the alert display 444 are related to data the service interface 124 accesses in the asset repository 109 when generating the event-based data set 230. The alert list 441 is further comprised of data configured to allow the list to be organized into contextualized categories 447. The contextualized categories 447 comprise, for example, tag id data, alert message data, time stamp data, NAMUR category data, alert type data, asset type data, manufacturer data, and the like. Acknowledgement indications 450 allow for indications to be entered with respect to the alert list 441. In an embodiment, the acknowledgement indications 450 allow for indications to be entered with respect to the acknowledgement or rejection of a contextualized alert 453.

Figure 8:
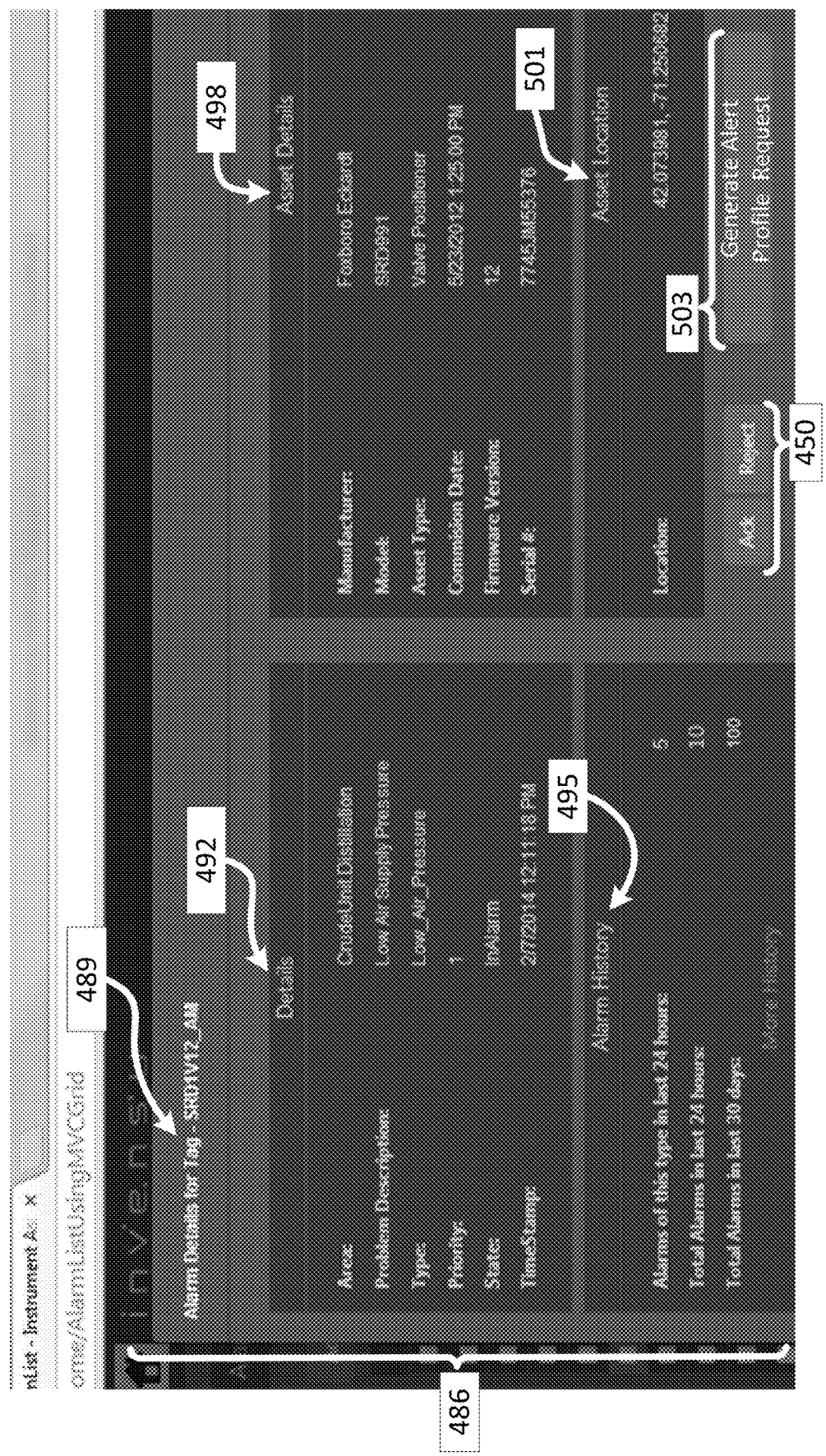
FIG. 8 is an exemplary screen shot of a user interface for displaying detailed alert data related to received event data according to an embodiment of the present invention.

FIG. 8 is an exemplary screen shot of a user interface for displaying detailed alert data related to received event data, according to an embodiment of the present invention. In the illustrated embodiment, data generated by the diagnostic contextualization component 115 as well as data related to the diagnostic bit set 236 and received by the diagnostic contextualization component 115 is used to generate the data used in the contextualized alert detail display 486. The contextualized alert detail display 486 is generated based on data related to a contextualized alert, such as contextualized alert 453 for example. Additionally or alternatively, contextualized alert detail display 486 is generated based on data related to a summarized alert 387. In an embodiment, the contextualized alert detail display 486 is organized according to alert detail data relating to alert identification tag 489 data. In an embodiment, the contextualized detail display 486 comprises alert tag detail display 492, alert history display 495, asset detail display 498, and asset location display 501.

With further reference to FIG. 8, tag alert detail display 492 is comprised of, for example, general area data, problem description data, type data, priority data, state data, time stamp data, and the like. In an embodiment, data accessed to render the tag alert detail display 492 and data accessed to render the functionalities provided by the tag alert detail display 492 are related to data the service interface 124 accesses in the asset repository 109 when generating the event-based data set 230. Alert history display 495 is comprised of, for example, same type tag alert data within the last 24 hours, any type tag alert data within the last 24 hours, any type tag alert data within the last 30 days, and a "more history" button for receiving input relating to the display of additional alert history. In yet another embodiment, asset details display 498 is comprised of manufacturer data, model data, asset type data, commission date data, firmware version data, and/or serial number data. It is to be understood that this is the type of information collected in the process of configuring asset 112. Aspects of the present invention permits constructing a historical record of maintenance-related data for a configuration-free asset 112 based on the asset identification record when an asset identification record is not available because the particular asset 112 had not been previously configured. In another embodiment, the asset location display 501 is generated based on location data corresponding to latitude and longitude coordinates. Acknowledgement indications 450 are generated for contextualized alert detail display 486, and are configured for allowing indications to be entered with respect to a contextualized alert 453.

Still referring to FIG. 8, the alert detail display 486 further comprises an alert profile request 503 indication configured to automatically generate an alert profile in part based upon the data comprising the contextualized alert details display 486. In an embodiment, upon receiving input related to the alert profile request 503, the diagnostic contextualization component 115 is configured to execute alert profile generation 198 and alert profile management 201 as described herein. Receiving an indication related to alert profile generation 503 results in the creation of an alert resolution profile and receiving an indication related to the alert profile generation indication 503 results in providing a result related to actionable output to an alert resolution profile to update the alert resolution profile.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A computer implemented asset monitoring system interfacing with a commissioning component, said computer implemented system comprising:

an asset repository storing asset-related data, the asset-related data being related to one or more commissioned industrial process assets of an industrial process control system, the asset-related data stored in the asset repository comprising an asset maintenance record corresponding to each of the commissioned industrial process assets;

a diagnostic contextualization component coupled to the asset repository and configured to deploy configured parameters to one or more non-commissioned industrial process assets having no previous asset configuration within the system for commissioning the non-commissioned industrial process assets; and a service interface coupled to the asset repository and to a particular non-commissioned industrial process asset of the industrial process control system;

wherein the diagnostic contextualization component is further configured for:

receiving, via the service interface, event data from the particular non-commissioned industrial process asset, wherein the event data comprises an asset parameter descriptive of a condition of the particular non-commissioned industrial process asset within the industrial process control system, and wherein the particular non-commissioned industrial process asset has no previous asset configuration within the asset monitoring system;

accessing, via the service interface, the asset-related data in the asset repository corresponding to the particular non-commissioned industrial process asset based upon the received event data;

generating an event-based data set based upon the accessed asset-related data;

determining, based upon comparing the accessed asset-related data in the asset repository to the received event data, whether an asset maintenance record corresponding to the particular non-commissioned industrial process asset exists in the asset repository;

in response to the determining, where the asset maintenance record is determined to not exist in the asset repository indicating the particular non-commissioned industrial process asset has not been commissioned and has no previous asset configuration within the system, creating a new asset identification record corresponding to the particular non-commissioned industrial process asset, the new asset identification record comprising:
the generated event-based data set, and
additional asset-related data collected, via the service interface, from the particular non-commissioned industrial process asset, wherein the additional asset-related data is collected based on asset identification data identifying the particular non-commissioned industrial process asset;
rendering the new asset identification record in the asset repository in a configuration consistent with the one or more commissioned industrial process assets of the industrial process control system; and
deploying configured parameters to the particular non-commissioned industrial process asset corresponding to the new asset identification record such that the particular non-commissioned industrial process asset corresponding to the new asset identification record becomes commissioned within the industrial process control system by the commissioning component.

2. The computer implemented system of claim 1, wherein the diagnostic contextualization component is further configured to maintain a previously commissioned industrial process asset by combining the accessed asset-related data with the received event data to update the asset maintenance record where the asset maintenance record is determined to previously exist in the asset repository.

3. The computer implemented system of claim 1, wherein the service interface comprises a WCF service interface and wherein the asset-related data further comprises data descriptive of the particular non-commissioned industrial process asset.

4. The computer implemented system of claim 1, wherein the asset parameter comprises a diagnostic bit set descriptive of a condition of the particular non-commissioned industrial process asset.

5. The computer implemented system of claim 1, wherein generating the event-based data set further comprises collecting additional asset-related data from the service interface related to at least one of: asset vendor data, model data, serial number data, location data, and version data.

6. The computer implemented system of claim 1, wherein the event data comprises an alert descriptive of an alert condition of the particular non-commissioned industrial process asset, and wherein the diagnostic contextualization component is further configured for combining the accessed asset-related data with the event data to generate an alert log entry in the asset maintenance record, the alert log entry comprising at least one of:
data describing a mitigated state of the alert;
data associating each asset with an active alert related to the asset; and
data associating each asset with an alert resolution profile related to the asset.

7. The system of claim 1, wherein the service interface further comprises a set of service interfaces configured to parse at least one of the following from the asset-related data:
implementation data related to implementing one or more asset maintenance services natively on the asset; and
data related to transforming the alert into a protocol-specific format.

8. A tangible processor-readable memory storing processor-executable instructions that, when executed by a processor, configure the processor to interface with a commissioning component and further configure the processor to:
receive, via a service interface, event data from a non-commissioned industrial process asset, wherein the event data comprises an asset parameter descriptive of a condition of the non-commissioned industrial process asset within an industrial process control system;
collect, via the service interface, asset-related data corresponding to the non-commissioned industrial process asset from an asset repository based upon the received event data;
generate an event-based data set based upon the collected asset-related data;
determine, based upon comparing the collected asset-related data to the received event data, whether an asset maintenance record corresponding to the non-commissioned industrial process asset exists in the asset repository;
when the asset maintenance record is determined to not exist in the asset repository indicating the non-commissioned industrial process asset has not been commission and has no previous asset configuration within the system, create a new asset identification record corresponding to the non-commissioned industrial process asset, the new asset identification record comprising:
the generated event-based data set, and
additional asset-related data collected, via the service interface, from the non-commissioned industrial process asset, wherein the additional asset-related data is collected based on asset identification data identifying the non-commissioned industrial process asset;
render the new asset identification record in an asset repository in a configuration consistent with one or more commissioned industrial process assets of the industrial process control system; and
deploy configured parameters to the non-commissioned industrial process asset corresponding to the new asset identification record such that the non-commissioned industrial process asset corresponding to the new asset identification record becomes commissioned within the industrial process control system by the commissioning component.

9. The tangible processor-readable memory of claim 8, the instructions further comprising instructions that, when executed by the processor, configure the processor to:
receive event data from a commissioned industrial process asset;
collect, via the service interface, asset-related data corresponding to the commissioned industrial process asset from the asset repository based upon the received event data;
determine, based upon comparing the collected asset-related data corresponding to the commissioned industrial process asset to the asset identification records in the asset repository, that the asset maintenance record corresponding to the commissioned industrial process asset exists in the asset repository; and
combine the collected asset-related data corresponding to the commissioned industrial process asset with the received event data from the commissioned industrial process asset to update the asset maintenance record for the commissioned industrial process asset where the asset maintenance record is determined to previously exist in the asset repository.

10. The tangible processor-readable memory of claim 8, wherein the service interface comprises a WCF service interface and wherein the asset-related data further comprises data descriptive of the asset.

11. The tangible processor-readable memory of claim 8, wherein the asset parameter comprises a diagnostic bit set descriptive of a condition of the non-commissioned industrial process asset.

12. The tangible processor-readable memory of claim 8, wherein the instructions that, when executed by the processor, configure the processor to generate the event-based data set further configure the processor to collect additional asset-related data from the service interface related to at least one of: asset vendor data, model data, serial number data, location data, and version data.

13. The tangible processor-readable memory of claim 8, wherein the event data comprises an alert descriptive of industrial process asset, and the instructions further comprising instructions that, when executed by the processor, configure the processor to combine the asset-related data with the event data to generate an alert log entry in the asset maintenance record, the alert log entry comprising at least one of:
   data describing a mitigated state of the alert;
   data associating each asset with an active alert related to the asset; and
   data associating each asset with an alert resolution profile related to the asset.

14. The tangible processor-readable memory of claim 8, wherein the service interface further comprises a set of service interfaces configured to parse at least one of the following from the asset-related data:
   implementation data related to implementing one or more asset maintenance services natively on the asset; and
   data related to transforming the alert into a protocol-specific format.

15. A computerized method for operating an asset monitoring system which interfaces with a commissioning component to generate and update asset maintenance records for industrial process assets having no previous asset commission within the asset monitoring system, comprising:
   receiving, via a service interface, event data from a non-commissioned industrial process asset, wherein the event data comprises an asset parameter descriptive of a condition of the non-commissioned industrial process asset within an industrial process control system;
   collecting, via the service interface, asset-related data corresponding to the non-commissioned industrial process asset from an asset repository based upon the received event data;
   generating an event-based data set based upon the collected asset-related data;
   determining, based upon comparing the collected asset-related data to the received event data, whether an asset maintenance record corresponding to the non-commissioned industrial process asset exists in the asset repository;
   when the asset maintenance record is determined to not exist in the asset repository indicating the non-commissioned industrial process asset has not been commission and has no previous asset configuration within the system, creating a new asset identification record corresponding to the non-commissioned industrial process asset, the new asset identification record comprising:
      the generated event-based data set, and
      additional asset-related data collected, via the service interface, from the non-commissioned industrial process asset, wherein the additional asset-related data is collected based on asset identification data identifying the non-commissioned industrial process asset;
   rendering the new asset identification record in an asset repository in a configuration consistent with one or more commissioned industrial process assets of the industrial process control system; and
   deploying configured parameters to the non-commissioned industrial process asset corresponding to the new asset identification record such that the non-commissioned industrial process asset corresponding to the new asset identification record becomes commissioned within the industrial process control system by the commissioning component.

16. The computerized method of claim 15, further comprising:
   receiving event data from a commissioned industrial process asset;
   collecting, via the service interface, asset-related data corresponding to the commissioned industrial process asset from the asset repository based upon the received event data;
   determining, based upon comparing the collected asset-related data corresponding to the commissioned industrial process asset to the asset identification records in the asset repository, that the asset maintenance record corresponding to the commissioned industrial process asset exists in the asset repository; and
   combining the collected asset-related data corresponding to the commissioned industrial process asset with the received event data from the commissioned industrial process asset to update the asset maintenance record for the commissioned industrial process asset where the asset maintenance record is determined to previously exist in the asset repository.

17. The computerized method of claim 15, wherein generating the event-based data set further comprises collecting additional asset-related data from the service interface related to at least one of: asset vendor data, model data, serial number data, location data, and version data.

18. The computerized method of claim 15, wherein the event data comprises an alert descriptive of the industrial process asset, and further comprising combining the asset-related data with the event-based data set to generate an alert log entry in the asset maintenance record, the alert log entry comprising at least one of:
   data describing a mitigated state of the alert;
   data associating each asset with an active alert related to the asset; and
   data associating each asset with an alert resolution profile related to the asset.

19. The computerized method of claim 15, wherein the service interface further comprises a set of service interfaces configured to parse protocol-specific format information from the asset-related data.

20. The computerized method of claim 15, wherein the asset parameter comprises a diagnostic bit set descriptive of a condition of the non-commissioned industrial process asset.

* * * * *